ELECTROLESS PLATING PROCEDURE
Filed Jan. 3, 1962
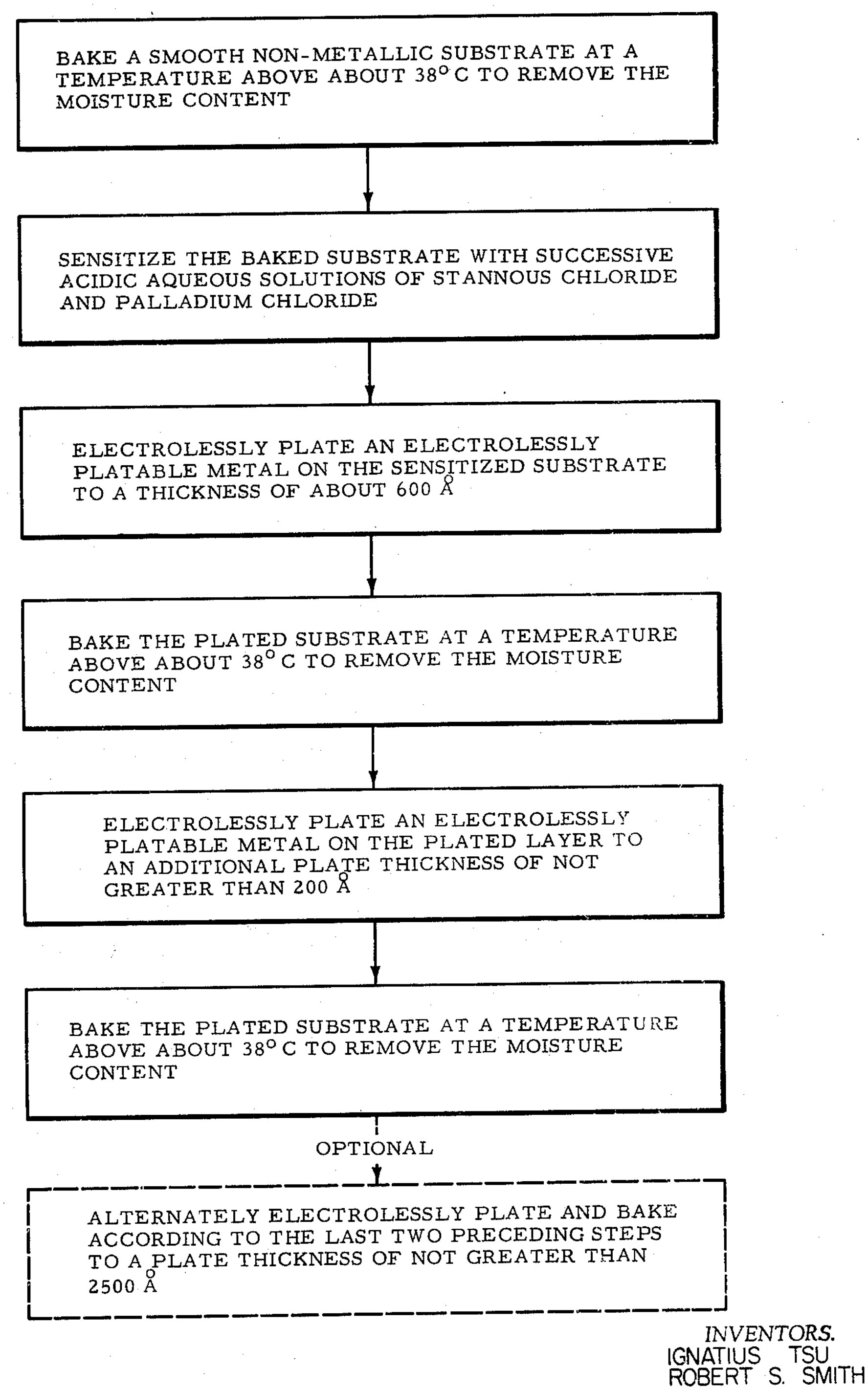
INVENTORS.
IGNATIUS TSU
ROBERT S. SMITH
BY Edward W. Brown
ATTORNEY United States Patent Office 3,212,917
Patented Oct. 19, 1965

3,212,917
ELECTROLESS PLATING PROCEDURE

Ignatius Tsu and Robert S. Smith, San Jose, Calif., assignors to International Business Machines Corporation, New York, N.Y., a corporation of New York Filed Jan. 3, 1962, Ser. No. 164,189
8 Claims. (Cl. 117—47)

Our invention relates to electroless plating on non-metallic substrates and, more particularly, to depositing thick plates on such substrates.

It is known that electroless plating on non-metallic substrates is more efficient if the substrate is sensitized by dipping the substrate in an acidic aqueous solution of stannous chloride, rinsing the substrate and dipping the substrate in acidic palladium chloride prior to electroless plating nickel, cobalt, or alloys of these metals on the substrate.

Plates more than about 600 A. thickness peel from unetched substrates, even when the above method is utilized.

For most purposes, a slightly etched substrate is adequate but magnetic computer storage elements must be extremely smooth if a gliding head is to ride on an air bearing 2.5–5$\mu$ above the surface of the element. Such extreme smoothness is readily obtained on glass, ceramics, or plastics. Heretofore, these materials have been of little or no use for recording purposes because plates thick enough to ensure wearability could not be adhered to these substrates.

We have now discovered that thick plates can be made to adhere to the ultra smooth surfaces of glass and plastics. Essentially, our process comprises baking the substrate prior to the sensitizing thereof, and alternately plating and baking increments of a final plate on to the substrate until a desired plate thickness is obtained.

In the accompanying drawing, the single figure is a flow chart of the process steps of the invention.

Generally, any of the metals normally plated by electroless processes can be incrementally deposited on a substrate by the process of our invention. However, we prefer to plate magnetic metals and alloys, such as cobalt and alloys of nickel and cobalt. The plating baths, equipment, etc., useful in our process are also those commonly used in electroless plating procedures.

More specifically, our process comprises baking the substrate to be plated, treating the baked substrate with stannous and palladium chloride according to the teachings of the prior art, electrolessly plating a metal on the sensitized substrate, up to about 600 A. thickness, removing the plated substrate from the plating bath, baking the plated substrate, plating an additional layer of material on the substrate up to about 200 A. thickness, baking the twice-plated substrate, and continuing the plating-baking cycle until a plate of desired thickness is obtained. The plate should be no thicker than about 2,500 A.

The substrate and/or unplated substrate is baked to about 100° C. for up to about thirty minutes. The minimum baking temperature is about 38° C. The heating must be slow where soft glass is used or the glass will crack. Generally, the plate need be heated only about 10–15 minutes.

The following illustrations more fully describe our invention. It is not intended that our invention be limited to the exact bath or plating procedures shown, but rather that all equivalents obvious to those skilled in the art shall be included within the scope of our invention as claimed.

*Example I*

A glass substrate was first cleaned with laboratory cleaning solution ($H_2SO_4$+dichromate) and rinsed in water. The glass was then stream cleaned to remove the thin film of cleaning solution remaining after the water rinse, baked for 30 minutes at 150° F. to remove moisture content, and then sensitized in stannous chloride sensitizer and given a thorough water rinse, followed by immersion in a second sensitizer comprised of $$PdCl_2.2H_2O$$

and concentrated HCl. It was then plated to 600 A. thickness in the electroless nickel plating bath which consists of the following:

| | |
|---|---|
| $NiCl_2.6H_2O$ | 30 g./l. |
| $NaH_2PO_2.H_2O$ | 10 g./l. |
| $Na_3C_6H_5O_7.2H_2O$ | 100 g./l. |
| $NH_4Cl$ | 50 g./l. |
| $NH_4OH$ (pH=7.5–8.5). | |

Temperature is normally 95 degrees C.

The finished product was rinsed in water and baked to remove moisture content.

The plated substrate was dipped in the bath for about ten seconds and baked for fifteen minutes at 100° C.

The plating and baking cycle was repeated until a final thickness of about ten microinches was obtained. The finished plate could be used as an optical reflector.

*Example II*

To plate polymethylmethacrylate and polystyrene, the procedure of Example I is followed with the exception that the baking temperature is always maintained below the softening point of the polymer.

Now, having described our invention, we claim:

1. An electrolessly plating process, wherein a non-metallic substrate having a surface of such smoothness that electrolessly plated thicknesses of over about 600 A. fail to adhere thereto, comprising the sequential steps of:
   baking said substrate at a temperature above about 38° C. for a time sufficient to remove substantially all of the moisture from the substrate;
   sensitizing said smooth substrate surface with successive acidic aqueous solutions of stannous chloride and palladium chloride;
   electrolessly plating an electrolessly platable metal on said sensitized substrate surface to an initial plate thickness of about 600 A.;
   baking said plated substrate at a temperature above about 38° C. for a time sufficient to remove substantially all of the moisture from the plated layer of the substrate; and
   electrolessly plating an electrolessly platable metal on said baked plated layer to an additional plate thickness up to about 200 A. so as to provide a total plate thickness of greater than said initial plate thickness and over about 600 A.

2. An electrolessly plating process, wherein a non-metallic substrate having a surface of such smoothness that electrolessly plated thicknesses of over about 600 A. fail to adhere thereto, comprising the sequential steps of:
   baking said substrate at a temperature above about 38° C. for a time sufficient to remove substantially all of the moisture from the substrate;
   sensitizing said smooth substrate surface with successive acidic aqueous solutions of stannous chloride and palladium chloride;
   electrolessly plating an electrolessly platable metal on said sensitized substrate surface to an initial plate thickness of about 600 A.;

baking said plated substrate at a temperature above about 38° C. for a time sufficient to remove substantially all of the moisture from the plated layer of the substrate; and alternately electrolessly plating additional electrolessly platable metal on said plated, baked substrate and baking said substrate, at a temperature above about 38° C. for a time sufficient to remove substantially all of the moisture from the additional plated layer of the substrate, to provide a total plate thickness of greater than said initial plate thickness and over about 600 A. but not greater than about 2500 A., said additional plating being deposited in increments up to about 200 A. in thickness.

3. An electrolessly plating process, wherein a nonmetallic substrate having a surface of such smoothness that electrolessly plated thicknesses of over about 600 A. fail to adhere thereto, comprising the sequential steps of:

baking said substrate selected from the group consisting of glass substrates, ceramic substrates, and plastic substrates, at a temperature above about 38° C. for a time sufficient to remove substantially all of the moisture from the substrate;

sensitizing said smooth substrate surface with successive acidic aqueous solutions of stannous chloride and palladium chloride;

electrolessly plating an electrolessly platable metal on said sensitized substrate surface to an initial plate thickness of about 600 A.;

baking said plated substrate at a temperature above about 38° C. for a time sufficient to remove substantially all of the moisture from the plated layer of the substrate; and electrolessly plating an electrolessly platable metal on said plated layer to an additional plate thickness up to about 200 A. so as to provide a total plate thickness of greater than said initial plate thickness and over about 600 A.

4. An electrolessly plating process, wherein a nonmetallic substrate having a surface of such smoothness that electrolessly plated thicknesses of over about 600 A. fail to adhere thereto, comprising the sequential steps of:

baking said substrate selected from the group consisting of glass substrates, ceramic substrates, and plastic substrates, at a temperature above about 38° C. for a time sufficient to remove substantially all of the moisture from the substrate;

sensitizing said smooth substrate surface with successive acidic aqueous solutions of stannous chloride and palladium chloride;

electrolessly plating metal on said sensitized substrate surface to an initial plate thickness of about 600 A.;

baking said plated substrate at a temperature above about 38° C. for a time sufficient to remove substantially all of the moisture from the plated layer of the substrate; and alternately electrolessly plating additional electrolessly platable metal on said plated, baked substrate and baking said substrate, at a temperature above about 38° C. for a time sufficient to remove substantially all of the moisture from the additional plated layer of the substrate, to provide a total plate thickness of greater than said initial plate thickness and over about 600 A. but not greater than about 2500 A., said additional plating being deposited in increments up to about 200 A. in thickness.

5. An electrolessly plating process, wherein a nonmetallic substrate having a surface of such smoothness that electrolessly plated thicknesses of over about 600 A. fail to adhere thereto, comprising the sequential steps of:

baking said substrate selected from the group consisting of glass substrates, ceramic substrates, and plastic substrates, at a temperature above about 38° C. for a time sufficient to remove substantially all of the moisture from the substrate;

sensitizing said smooth substrate surface with successive acidic aqueous solutions of stannous chloride and palladium chloride;

electrolessly plating an electrolessly platable metal selected from the group consisting of nickel, cobalt, and alloys of nickel and cobalt, on said sensitized substrate surface to an initial plate thickness of about 600 A.;

baking said plated substrate at a temperature above about 38° C. for a time sufficient to remove substantially all of the moisture from the plated layer of the substrate; and electrolessly plating said electrolessly platable metal on said baked plated layer to an additional plate thickness up to about 200 A. so as to provide a total plate thickness of greater than said initial plate thickness and over about 600 A.

6. An electrolessly plating process, wherein a nonmetallic substrate having a surface of such smoothness that electrolessly plated thicknesses of over about 600 A. fail to adhere thereto, comprising the sequential steps of:

baking said substrate selected from the group consisting of glass substrates, ceramic substrates, and plastic substrates, at a temperature above about 38° C. for a time sufficient to remove substantially all of the moisture from the substrate;

sensitizing said smooth substrate surface with successive acidic aqueous solutions of stannous chloride and palladium chloride;

electrolessly plating an electrolessly platable metal selected from the group consisting of nickel, cobalt, and alloys of nickel and cobalt, on said sensitized substrate surface to an initial plate thickness of about 600 A.;

baking said plated substrate at a temperature above about 38° C. for a time sufficient to remove substantially all of the moisture from the plated layer of the substrate; and alternately electrolessly plating additional metal of said electrolessly platable metal on said plated, baked substrate and baking said substrate, at a temperature above about 38° C. for a time sufficient to remove substantially all of the moisture from the additional plated layer of the substrate, to provide a total plate thickness of greater than said initial plate thickness and over about 600 A. but not greater than about 2500 A., said additional plating being deposited in increments up to about 200 A. in thickness.

7. An electrolessly plating process, wherein a nonmetallic substrate having a surface of such smoothness that electrolessly plated thicknesses over about 600 A. fail to adhere thereto, comprising the sequential steps of:

baking said substrate at a temperature above about 38° C. for a time sufficient to remove substantially all of the moisture from the substrate;

sensitizing said smooth substrate surface with successive acidic aqueous solutions of stannous chloride and palladium chloride;

electrolessly plating an electrolessly platable metal on said sensitized substrate surface to an initial plate thickness of about 600 A.; and alternately baking said substrate, at a temperature above about 38° C. for a time sufficient to remove substantially all of the moisture from the plated layer of the substrate, and electrolessly plating additional electrolessly platable metal on said plated, baked substrate to provide a total plate thickness of greater than said initial plate thickness and over about 600 A. but not greater than about 2500 A., said additional plating being deposited in increments up to about 200 A. in thickness.

8. An electrolessly plating process, wherein a nonmetallic substrate having a surface of such smoothness that electrolessly plated thicknesses of over about 600

A. fail to adhere thereto, comprising the sequential steps of:

baking said substrate selected from the group consisting of glass substrates, ceramic substrates, and plastic substrates, at a temperature above about 38° C. for a time sufficient to remove substantially all of the moisture from the substrate;

sensitizing said smooth substrate surface with successive acidic aqueous solutions of stannous chloride and palladium chloride;

electrolessly plating an electrolessly platable metal selected from the group consisting of nickel, cobalt, and alloys of nickel and cobalt, on said sensitized substrate surface to an initial plate thickness of about 600 A.; and alternately baking said substrate, at a temperature above about 38° C. for a time sufficient to remove substantially all of the moisture from the additional plated layer of the substrate, and electrolessly plating additional metal of said electrolessly platable metal on said plated, baked substrate to provide a total plate thickness of greater than said initial plate thickness and over about 600 A. but not greater than about 2500 A., said additional plating being deposited in increments up to about 200 A. in thickness.

References Cited by the Examiner

UNITED STATES PATENTS

| | | | |
|---|---|---|---|
| 1,575,122 | 3/26 | Madsen | 148—6.3 |
| 2,088,949 | 8/37 | Fekete. | |
| 2,702,253 | 2/55 | Bergstrom | 117—130 |
| 2,757,104 | 7/56 | Hawes | 117—71 |
| 2,806,984 | 9/57 | Hoch | 117—119.6 |
| 2,939,804 | 6/60 | Schossberger et al. | 117—71 |
| 2,992,125 | 7/61 | Fustier | 117—71 |

OTHER REFERENCES

West I: "Electroless Nickel," in Metal Finishing, vol. 51, September 1953, page 68.

West II: "Electroless Nickel Barrel Plating," in Metal Finishing, vol. 52, March 1954, page 64.

Brenner et al.: "Deposition of Nickel and Cobalt by Chemical Reduction," in Journal of Research of the National Bureau of Standards, vol. 39, November 1947, pages 385–395.

WILLIAM D. MARTIN, *Primary Examiner.*

RICHARD D. NEVIUS, *Examiner.*